United States Patent [19]

Kiess et al.

[11] Patent Number: 5,431,044
[45] Date of Patent: Jul. 11, 1995

[54] COMBUSTION DETECTION CIRCUIT FOR A CATALYTIC CONVERTER PREHEATER

[75] Inventors: Ronald J. Kiess, Decatur; Norman H. Bracken, Anderson, both of Ind.

[73] Assignee: General Motors Corporation, Detroit, Mich.

[21] Appl. No.: 298,884

[22] Filed: Aug. 31, 1994

[51] Int. Cl.$^6$ .......................................... G01L 23/00
[52] U.S. Cl. .................................. 73/117.3; 324/391
[58] Field of Search ...................... 73/117.3; 324/391

[56] References Cited

U.S. PATENT DOCUMENTS

| | | | |
|---|---|---|---|
| 3,781,838 | 12/1974 | Primmer | 340/237 |
| 4,102,127 | 7/1978 | Saiki et al. | 60/284 |
| 4,648,367 | 3/1987 | Gillbrand et al. | 123/425 |
| 4,862,093 | 8/1989 | Jiewertz | 324/464 |
| 5,087,882 | 2/1992 | Iwata | 324/388 |
| 5,189,373 | 2/1993 | Murata et al. | 324/399 |
| 5,222,393 | 6/1993 | Ohsawa | 73/117.3 |
| 5,230,240 | 7/1993 | Ohsawa et al. | 73/116 |
| 5,247,919 | 9/1993 | Akaki et al. | 123/606 |
| 5,253,475 | 10/1993 | Kabasin | 60/274 |
| 5,283,527 | 2/1994 | DeBiasi | 324/391 |

OTHER PUBLICATIONS

SAE Paper 930461, entitled "Spark Plug Voltage Analysis for Monitoring Combustion in an Internal Combustion Engine"; Yuichi Shimasaki et al. (pp. 1-21) (1993).
SAE Paper 930462, entitled "Flame Ion Density Measurement Using Spark Plug Voltage Analysis"; Miyata et al. (pp. 1-11) (1993).

*Primary Examiner*—Richard E. Chilcot, Jr.
*Assistant Examiner*—Max Noori
*Attorney, Agent, or Firm*—Timothy G. Gorbatoff

[57] ABSTRACT

The present invention is directed to an electrical circuit for detecting the presence of combustion within a catalytic converter preheater. Combustion of an air/fuel mixture within the preheater results in a wide-band high voltage RF signal across a spark plug gap disposed within the preheater, which is trapped by an ignition coil coupled to the spark plug for energizing the spark plug gap. The presence of combustion will effectuate an elimination or absorption of one or more specific frequencies within the RF voltage band. By coupling a combustion detection circuit comprising an inductor-capacitor (L-C) or resistor-inductor-capacitor (R-L-C) network between ground and a low voltage output terminal of a secondary winding of the ignition coil, and properly tuning the network components to one of the specific absorption frequencies, an output voltage of the combustion detection circuit during discharge of the spark plug will be responsive to the absence or presence of combustion in the burner. The output voltage is characterized by (i) a high voltage spike in the absence of combustion during discharge of the spark plug, and (ii) a low voltage spike in the presence of combustion during discharge of the spark plug. A comparator means compares the output voltage with a predetermined threshold voltage and generates a binary high voltage pulse upon the occurrence of a misfire.

11 Claims, 3 Drawing Sheets

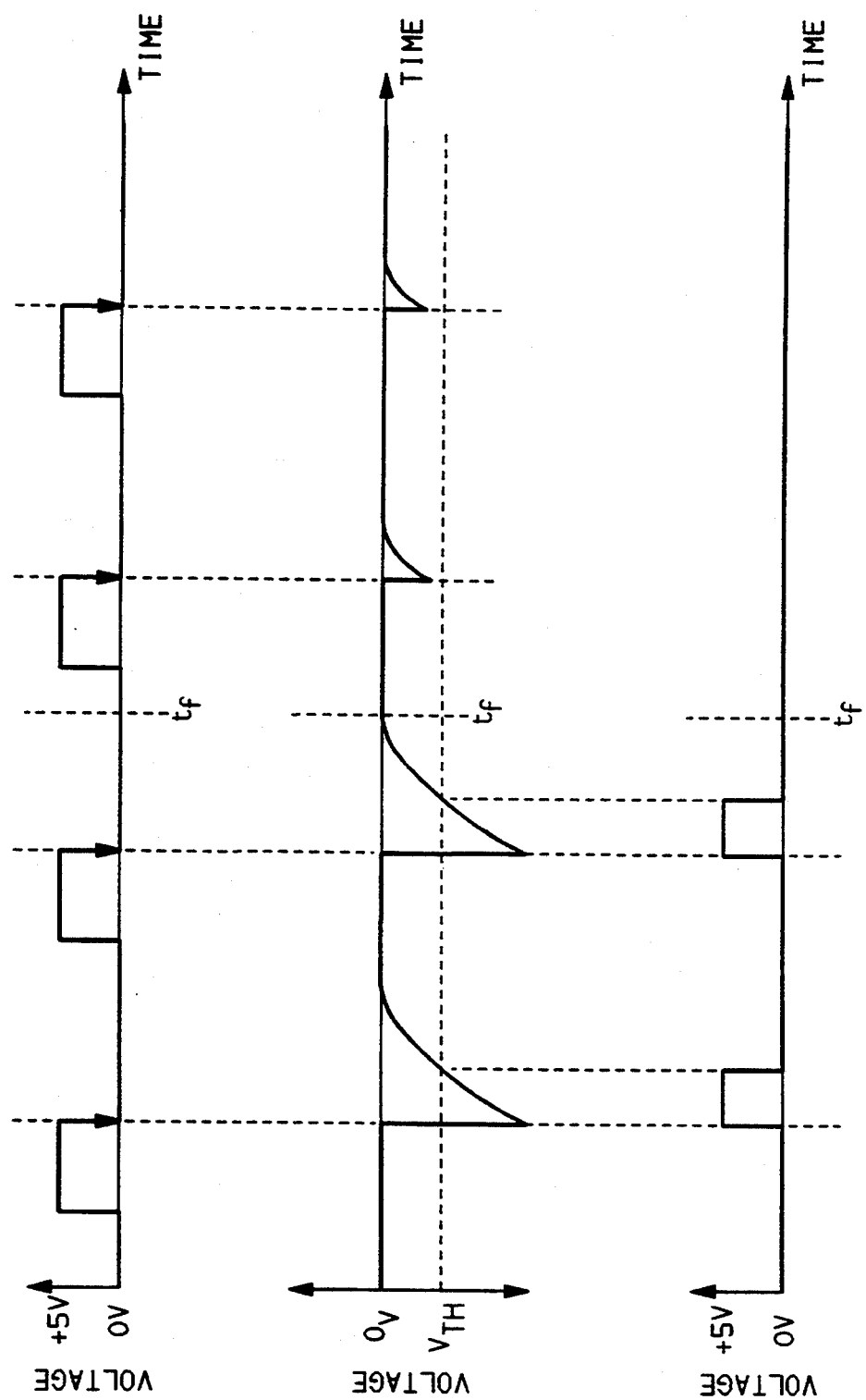

COMBUSTION DETECTION CIRCUIT FOR A CATALYTIC CONVERTER PREHEATER

The present invention relates to internal combustion engine emission control and, in particular, to combustion detection in catalytic converter preheaters.

BACKGROUND OF THE INVENTION

Catalytic converters are muffler-like devices which reduce the amount of harmful components in the exhaust gas of an internal combustion engine. The catalytic converter contains a catalyst which promotes chemical reactions, converting exhaust gas components such as CO, HC and $NO_x$ into $CO_2$, $H_2O$, N and $O_2$.

The efficiency of a catalytic converter dramatically improves as the temperature of its catalyst increases. Consequently, when a cold engine is started, the exhaust gases discharged into the atmosphere contain a higher percentage of CO, HC and $NO_x$ until the catalyst heats up. The catalyst is normally heated by the temperature of the exhaust gases passing through the converter, taking several minutes after engine start-up to achieve optimum temperature.

Several attempts have been made to reduce the amount of time required for the catalyst to heat up. These attempts have principally consisted of applying an external source of heat to the catalytic converter. One such method comprises a preheater which ignites an air/fuel mixture at a point slightly upstream of the catalytic converter whereby the released combustion energy operates to rapidly increase the catalyst temperature. Ignition is provided for by a periodic spark in proximity to the air/fuel mixture, such as from a conventional spark plug driven by a periodic energization signal from a controller.

With such systems, failure to ignite the air/fuel mixture will result in a substantial quantity of unburnt fuel being passed directly into the atmosphere, increasing the levels of undesirable emissions. Therefore, there is a diagnostic desire to determine whether fuel combustion has taken place. If the air/fuel mixture fails to ignite, the fuel supply and energization signal can be interrupted.

SUMMARY OF THE INVENTION

The present invention is directed to an electrical circuit for detecting the presence of combustion within a catalytic converter preheater. According to the present invention, an air/fuel mixture is supplied to a burner within a catalytic converter preheater. A spark plug having a spark plug gap disposed within the burner is discharged by an ignition coil to ignite the air/fuel mixture. Discharge of the spark plug results in a wide-band high voltage radio-frequency (RF) signal induced across the spark plug gap, the RF voltage being trapped by the ignition coil.

The presence of combustion within the burner will effectuate an elimination or absorption of one or more specific frequencies within the wide-band of RF voltage frequencies. By coupling a combustion detection circuit comprising an inductor-capacitor (L-C) or resistor-inductor-capacitor (R-L-C) network between ground and a low voltage output terminal of a secondary winding of the ignition coil, and properly tuning the network components to one of the specific absorption frequencies, an output voltage of the combustion detection circuit during discharge of the spark plug will be responsive to the absence or presence of combustion in the burner.

In the absence of combustion, the specific absorption frequencies are present and the output voltage of the combustion detection circuit will comprise a high voltage spike. Conversely, in the presence of combustion, the specific absorption frequencies are absent and the output voltage of the combustion detection circuit will comprise a low voltage spike. The voltage spikes are of a positive polarity if the spark plug is discharged with a positive voltage-to-ground potential; whereas, the voltage spikes are of a negative polarity if the spark plug is discharged with a negative voltage-to-ground potential.

Additionally, a comparator means can be incorporated such that the output voltage of the combustion detection circuit is compared with a predetermined threshold voltage, the comparator means generating a binary high voltage pulse upon the occurrence of a misfire (i.e., absence of combustion during discharge of the spark plug).

BRIEF DESCRIPTION OF THE DRAWINGS

FIGS. 3A-C are timing diagrams illustrating the time relationship between various signals of the circuit of FIG. 2.

DETAILED DESCRIPTION OF THE PREFERRED EMBODIMENT

Figure 1:
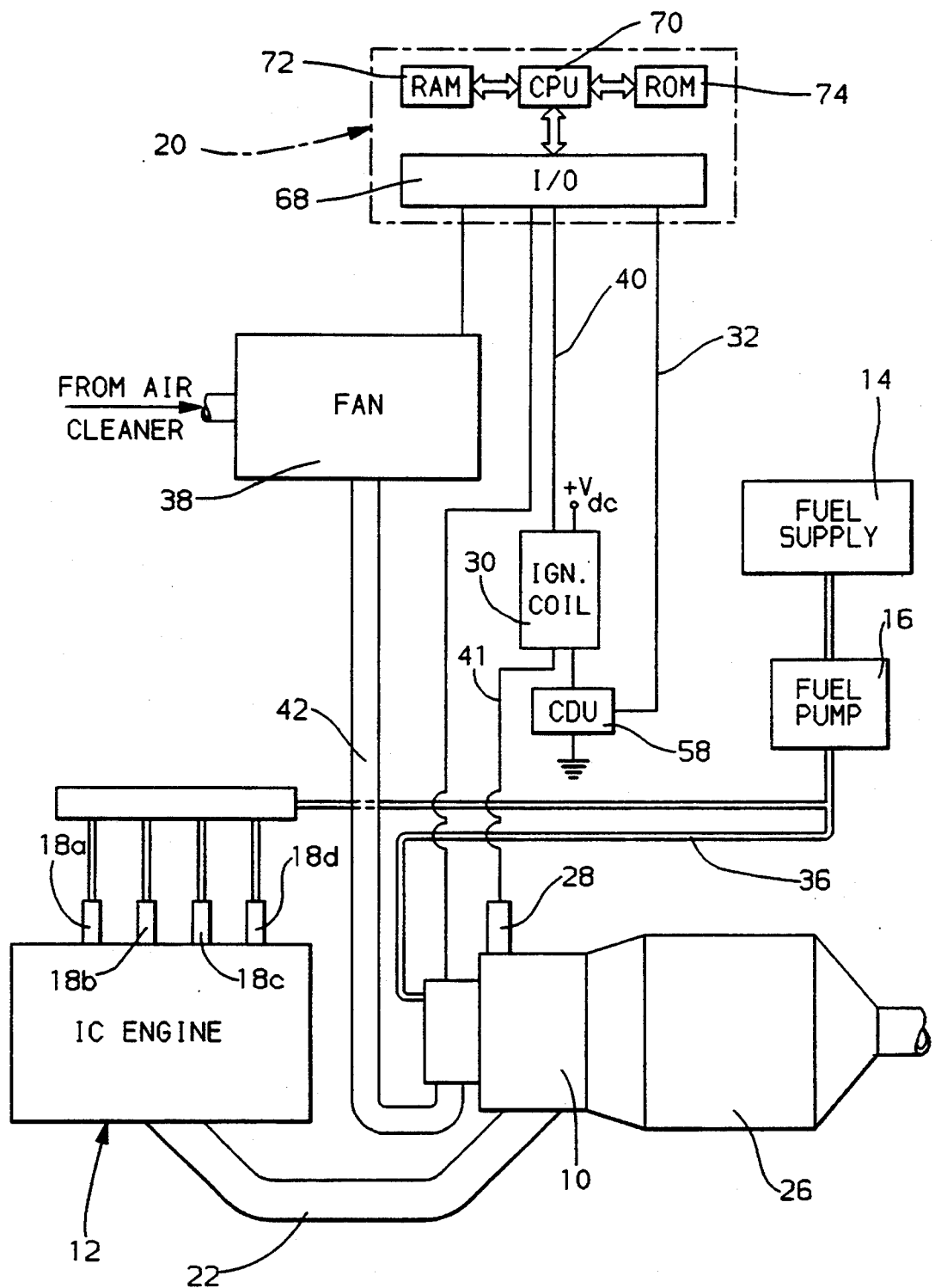
FIG. 1 illustrates a general diagram of a catalytic converter burner system with combustion detection.

Referring to the drawings, and more particularly to FIG. 1, a burner assembly 10 is disposed in the exhaust system of an internal combustion engine 12. The engine 12 is supplied with fuel from a fuel system comprising fuel supply 14, such as a fuel tank, and fuel pump 16 which delivers pressurized fuel to fuel injectors 18a–18d. A conventional engine controller (not shown) monitors engine parameters through sensors (not shown) and varies fuel, air and spark accordingly. Exhaust gas exits engine 12 through exhaust conduit 22 and enters burner assembly 10. The burner assembly is operably connected with catalytic converter 26 through which the exhaust gas passes after exiting burner assembly 10.

Combustion air is supplied to the burner assembly 10 via an engine driven or electrical air pump or fan 38 via conduit 42. The air pump or fan 38 receives fresh air passed through an air cleaner (not shown). The pump or fan 38 is controlled by a Burner Control Module BCM 20 so that a proper quantity of air is administered to the burner assembly 10 at appropriate times. The BCM 20 may be any conventional controller including input-/output ports I/O 68, a central processing unit CPU 70, random access memory RAM 72 and read only memory ROM 74.

Fuel is supplied to the burner assembly 10 from the fuel system via conduit 36. A conventional fuel injector (not shown) disposed in the burner assembly 10 receives the fuel from the fuel line 36, and meters the fuel into the burner assembly 10 in amounts and at times directed by the BCM 20. A conventional spark plug 28, disposed within the burner 10 and excited via spark plug excitation line 41, ignites the air/fuel mixture in the burner 10.

In a well-known manner, spark plug 28 is used to provide a periodic spark in the burner assembly 10 of FIG. 1 via the discharge of a conventional ignition coil 30. A Combustion Detection Unit CDU 58 is coupled between ground and a low voltage output terminal of a secondary winding of the ignition coil 30. The output of the CDU 58 is a voltage signal responsive to combustion in the burner 10, and is transmitted to the BCM 20 via signal line 32.

Figure 2:
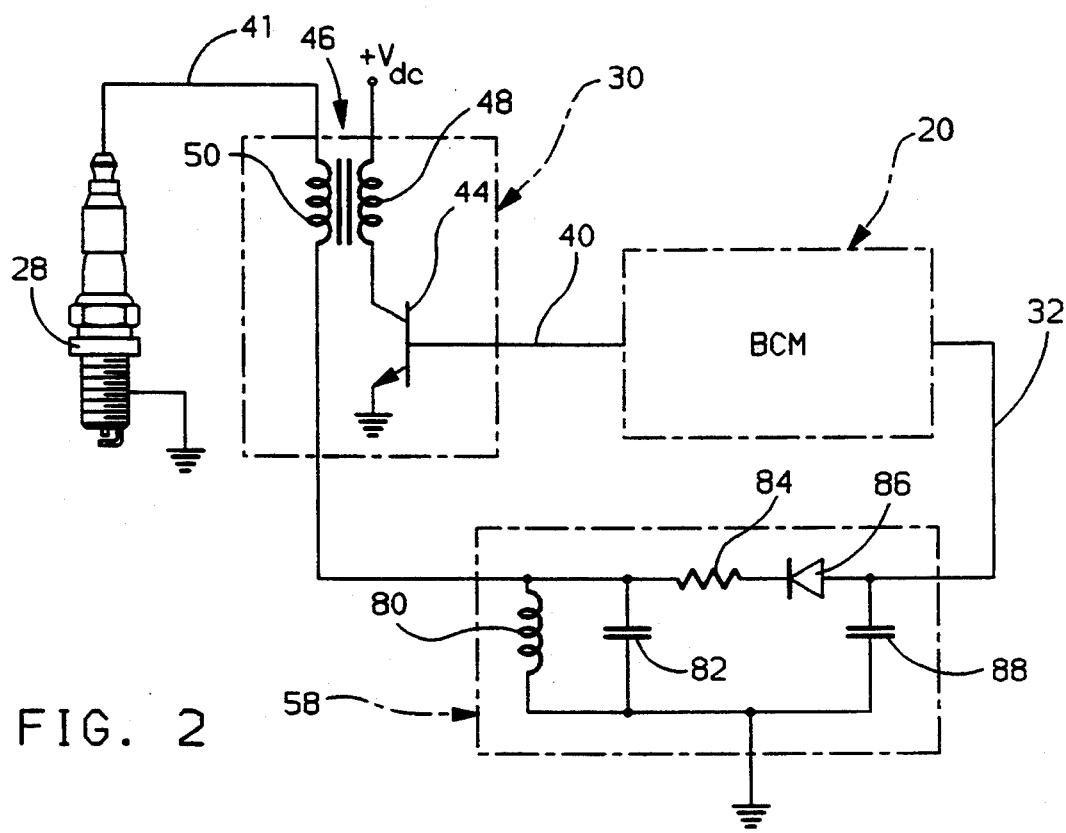
FIG. 2 illustrates a combustion detection circuit in accordance with the present invention.

The combustion detection circuit used to carry out combustion detection in accordance with the present invention is illustrated in FIG. 2. Referring to FIG. 2, reference numeral 58 generally designates the combustion detection circuit. Reference numeral 30 generally designates an ignition coil comprising a transistor 44 and transformer 46 having primary 48 and secondary 50 windings. The BCM 20 outputs a binary ignition pulse to transistor 44 via signal line 40 for controlling the transformer 44 and thereto the discharge of the ignition coil 30. While the ignition pulse is high, transistor 44 is turned on and conducts current which charges the primary winding 48.

When the primary winding 48 of the transformer 46 is sufficiently charged and the spark plug 28 is to be fired, the ignition pulse is set low, turning off the transistor 44. At the falling edge of the ignition pulse, the primary winding 48 discharges, thereby inducing a high voltage across the secondary winding 50. This induced high voltage forces a surge of current through line 41 which arcs across spaced electrodes of spark plug 28 disposed within the burner 10. The arc ignites an air/fuel mixture contained within the burner 10. Typically, combustion is maintained for a predetermined time period or until a predetermined catalytic converter temperature is reached. To maintain combustion, air and fuel are continuously metered into the burner 10 while the spark plug 28 is periodically discharged.

The combustion detection unit 58 is coupled between ground and the low voltage terminal of the secondary winding 50. There are distinct advantages to having combustion detection circuitry coupled to the low voltage terminal of the secondary winding 50. In particular, it eliminates the need for expensive high voltage electrical components (e.g., step-down coil) and high voltage dielectric insulators.

The voltage output of the Combustion Detection Unit CDU 58 is input into the Burner Control Module BCM 20 for controlling the flow of fuel and air to the catalytic converter burner 10, as well as energization of transformer 46. The Combustion Detection Unit 58 comprises a circuit having inductor 80, capacitors 82 and 88, resistor 84 and diode 86. Inductor (L) 80 and capacitor (C) 82 are connected in parallel, forming an L-C network which is disposed between ground and the low voltage end of the secondary winding 50 of transformer 46. Resistor 84, diode 86 and capacitor 88 are series-connected in parallel with the L-C network components 80 and 82, the cathode of diode 86 being connected to resistor 84, while the anode of diode 86 is connected to capacitor 88. Diode 86 rectifies the L-C network voltage, capacitor 88 provides filtering for improved signal processing, and resistor 84 decouples diode 86 from the L-C network components 80 and 82. The output voltage signal of the combustion detection circuit 58 corresponds to the voltage potential across capacitor 88, the output voltage signal being transmitted to the BCM 20 via signal line 32.

It has been found that, during discharge of the spark plug 28, a significant RF voltage is developed across the spark plug gap. The RF voltage is very wide-band (from a few hertz to several Mhz) and of significant amplitude over the frequency range. During combustion of the air/fuel mixture in the burner 10, there appears one or more specific narrow frequency bands within the wide-band RF voltage signal which are absent or absorbed. By properly selecting values for inductor (L) 80 and capacitor (C) 82, the natural frequency of the L-C network can be tuned to one of the specific frequency bands which are absent during combustion. In the absence of combustion, the frequency bands exist and result in the presence of a high voltage spike in the output signal of the combustion detection circuit 58. Conversely, in the presence of combustion, the frequency bands are essentially absent, resulting in a much reduced low voltage spike in the output signal. In this way, the output voltage of the combustion detection circuit 58 varies in response to the presence or absence of combustion in the burner 10 during discharge of the spark plug 28 by transformer 46.

FIGS. 3A-C are timing diagrams illustrating the time relationship between various signals of the combustion detection circuit of FIG. 2. Specifically, FIG. 3A illustrates the binary ignition pulse applied to transistor 44 by the BCM 20 via signal line 40 to discharge the transformer 46 and spark plug 28 as described. FIG. 3B illustrates the output voltage signal of the combustion detection circuit 58. In a critical aspect of this invention, the voltage transient at the output of the combustion detection circuit 58 in the absence of combustion in the burner assembly 10 upon discharge of the transformer 46 includes a negative high voltage spike. This spike is a short duration, negative amplitude signal excursion, illustrated as the signal in FIG. 3B which precedes time $t_f$. Although a similar excursion may be observed in the presence of combustion in burner assembly 10 upon discharge of the transformer 46, the peak magnitude of the spike will be substantially less, as generally illustrated in FIG. 3B as the signal after time $t_f$.

FIG. 3C generally illustrates a binary signal which discriminates the presence of combustion in the burner assembly 10, wherein binary high pulses (e.g., 5 V) are generated only when the larger magnitude negative voltages spike have been detected (i.e., misfire as defined by the absence of combustion during spark discharge). This is generally accomplished in the BCM 20 by means well-known to those skilled in the art via a comparator with a predetermined reference threshold voltage $V_{TH}$ such that (i) all voltages of the output signal of the combustion detection circuit 58, illustrated in FIG. 3B, less than the threshold voltage $V_{TH}$ result in a binary high output voltage, and (ii) all voltages of the output signal of the combustion detection circuit 58 greater than the threshold voltage $V_{TH}$ result in a binary low output voltage.

Figure 4:
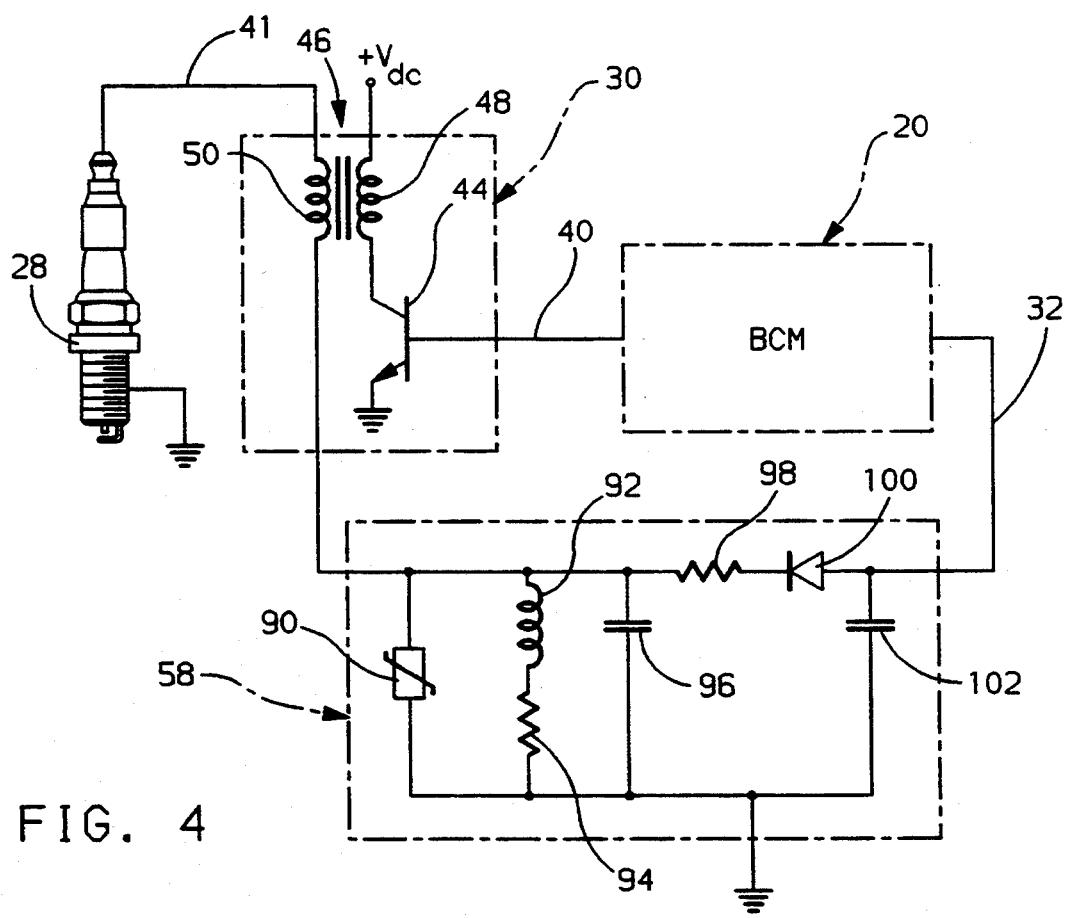
FIG. 4 illustrates a second embodiment of a combustion detection circuit.

An alternative embodiment of the combustion detection circuit of FIG. 2 is illustrated in FIG. 4. Like pans as those shown in FIG. 2 are identified by like reference numerals and repeated description thereof is omitted. Referring to FIG. 4, the Combustion Detection Unit 58 comprises a circuit having voltage clamp 90, inductor 92, resistors 94 and 98, capacitors 96 and 102, and diode 100. The voltage clamp 90 is coupled between ground and the low voltage end of the secondary winding 50. It is generally a back-to-back Zener diode or a metal-oxide-varistor (MOV) which operates to limit the maximum voltage across the network. Inductor 92 and resistor 94 are series-connected in parallel with capacitor 96 and voltage clamp 90. The resistor 94 lowers the quality factor of the inductor 92, thereby preventing ringing (i.e., improves signal discrimination ratio) of the R-L-C network components 92, 94 and 96. As with the corresponding components in the embodiment of FIG. 2, (i) diode 100 rectifies the RF voltage into a unipolar pulse, (ii) capacitor 102 provides filtering to broaden the output pulse for improved signal processing, and (iii) resistor 98 decouples diode 100 from the L-C circuit components 92, 94 and 96. The alternative circuitry operates to provide for the same output voltage signals as that of FIG. 2, illustrated in FIGS. 3A-C.

The signal graph of FIG. 3B illustrates negative output voltage spikes upon discharge of the transformer 46. The peak magnitude of the spikes vary, depending upon the presence or absence of combustion in the burner assembly 10. The output voltage spikes are of a negative polarity as a result of transformer 46 discharging spark plug 28 of FIGS. 2 and 4 with a negative voltage-to-ground potential via line 41. Diodes 86 and 100, respectively, provide signal rectification.

Conversely, a signal graph having voltage spikes of a positive polarity can be achieved by discharging the spark plug 28 of FIGS. 2 and 4 with a positive voltage-to-ground potential via signal line 41, and reversing the anode-to-cathode orientation of rectification diodes 86 and 100, respectively. For signal graphs having positive polarity voltage spikes, the comparator means with predetermined threshold voltage $V_{TH}$, referred to above with reference to FIG. 3C, is also modified such that all voltages of the output signal greater than the threshold voltage $V_{TH}$ result in a binary high output voltage, while all voltages of the output signal less than the threshold voltage $V_{TH}$ result in a binary low output voltage. However, the binary high output pulses similarly represent a misfire condition.

While the present invention has been described in reference to the illustrated embodiments, it will be recognized that various modifications will occur to those skilled in the art. In this regard, it will be understood that apparatuses incorporating such modifications may fall within the scope of this invention, which is defined by the appended claims.

The embodiments of this invention in which an exclusive property or privilege is claimed are defined as follows:

1. A circuit for detecting the presence of combustion in a burner for an automotive catalytic converter, the burner having a spark means, a supply of air and fuel forming an air/fuel mixture in the burner, and an ignition coil for providing energizing voltage to discharge the spark means for igniting the air/fuel mixture, the ignition coil having a secondary winding, the secondary winding having a low voltage output terminal, the circuit comprising:
   a first circuit means coupled between ground and the low voltage output terminal of the secondary winding of the ignition coil and producing a first voltage, the first circuit means having a natural frequency which is tuned to a specific frequency, the specific frequency being (i) absent in the presence of combustion of the air/fuel mixture in the burner during discharge of the spark means, and (ii) present in the absence of combustion of the air/fuel mixture in the burner during discharge of the spark means; and
   a second circuit means coupled to the first circuit means for rectifying the first voltage and producing a second voltage having (i) a high voltage spike in the absence of combustion during discharge of the spark means, and (ii) a low voltage spike in the presence of combustion during discharge of the spark means.

2. The combustion detection circuit according to claim 1, wherein the high voltage spike and low voltage spike are one of a positive and negative polarity.

3. The combustion detection circuit according to claim 1, further comprising a comparator means for comparing the output voltage with a predetermined threshold voltage wherein a positive polarity output voltage greater than the threshold voltage corresponds to the absence of combustion in the burner during discharge of the spark plug.

4. The combustion detection circuit according to claim 1, further comprising a comparator means for comparing the output voltage with a predetermined threshold voltage, wherein a negative polarity output voltage less than the threshold voltage corresponds to the absence of combustion in the burner during discharge of the spark plug.

5. A circuit for detecting the presence of combustion in a burner for an automotive catalytic converter, the burner having a spark means, a supply of air and fuel forming an air/fuel mixture in the burner, and an ignition coil for providing energizing voltage to discharge the spark means for igniting the air/fuel mixture, the ignition coil having a secondary winding, the secondary winding having a low voltage output terminal, the circuit comprising:
   an inductor coupled between ground and the low voltage output terminal of the secondary winding of the ignition coil;
   a first capacitor connected in parallel with the inductor, forming an L-C network with the inductor;
   a resistor;
   a diode connected in series with the resistor; and
   a second capacitor connected in series with the resistor and diode, the series-connected resistor, diode and capacitor being electrically connected in parallel with the L-C network, the voltage across the second capacitor being the output voltage of the combustion detection circuit, the output voltage having (i) a high voltage spike in the absence of combustion during discharge of the spark means, and (ii) a low voltage spike in the presence of combustion during discharge of the spark means.

6. The combustion detection circuit according to claim 5, wherein the L-C network comprises a natural frequency which is tuned to a specific frequency, the specific frequency being (i) absent in the presence of combustion of the air/fuel mixture in the burner during discharge of the spark means, and (ii) present in the absence of combustion of the air/fuel mixture in the burner during discharge of the spark means.

7. The combustion detection circuit according to claim 5, wherein the high voltage spike and low voltage spike are one of a positive and negative polarity.

8. A circuit for detecting the presence of combustion in a burner for an automotive catalytic converter, the burner having a spark means, a supply of air and fuel forming an air/fuel mixture in the burner, and an ignition coil for providing energizing voltage to discharge the spark means for igniting the air/fuel mixture, the ignition coil having a secondary winding, the secondary winding having a low voltage output terminal, the circuit comprising:
- a voltage clamp coupled between ground and the low voltage output terminal of the secondary winding of the ignition coil;
- an inductor;
- a first resistor connected in series with the inductor, the series-connected inductor and first resistor being electrically connected in parallel with the voltage clamp;
- a first capacitor connected in parallel with the voltage clamp, forming an R-L-C network with the inductor and first resistor;
- a second resistor;
- a diode connected in series with the second resistor; and
- a second capacitor connected in series with the second resistor and diode, the series-connected second resistor, diode and second capacitor being electrically connected in parallel with the R-L-C network, the voltage across the second capacitor being the output voltage of the combustion detection circuit, the output voltage having (i) a high voltage spike in the absence of combustion during discharge of the spark means, and (ii) a low voltage spike in the presence of combustion during discharge of the spark means.

9. The apparatus according to claim 8, wherein the R-L-C network comprises a natural frequency which is tuned to a specific frequency, the specific frequency being (i) absent in the presence of combustion of the air/fuel mixture in the burner during discharge of the spark means, and (ii) present in the absence of combustion of the air/fuel mixture in the burner during discharge of the spark means.

10. The apparatus according to claim 8, wherein the voltage clamp is one of a back-to-back zener diode and a metal-oxide-varistor for limiting a maximum voltage developed between ground and the low voltage output terminal of the secondary winding.

11. The combustion detection circuit according to claim 8, wherein the high voltage spike and low voltage spike are one of a positive and negative polarity.

* * * * *